(12) United States Patent
Elliott et al.

(10) Patent No.: US 9,709,294 B2
(45) Date of Patent: Jul. 18, 2017

(54) AIR CONDITIONING SYSTEM FOR DEHUMIDIFYING AND COOLING AIR

(71) Applicant: Consolidated Energy Solutions Inc., Toronto (CA)

(72) Inventors: Bryan Cyril Elliott, Toronto (CA); Phillip Walker, Toronto (CA); Marty Robbins, Jasper, GA (US); Allen Payne, Conyers, GA (US)

(73) Assignee: CONSOLIDATED ENERGY SOLUTIONS INC., Ontario (CA)

( * ) Notice: Subject to any disclaimer, the term of this patent is extended or adjusted under 35 U.S.C. 154(b) by 1091 days.

(21) Appl. No.: 13/623,712

(22) Filed: Sep. 20, 2012

(65) Prior Publication Data

US 2014/0075977 A1    Mar. 20, 2014

(51) Int. Cl.
| | |
|---|---|
| *F24F 11/08* | (2006.01) |
| *F24F 11/00* | (2006.01) |
| *F24F 3/14* | (2006.01) |
| *F24F 1/00* | (2011.01) |

(52) U.S. Cl.
CPC ........ *F24F 11/0079* (2013.01); *F24F 3/1405* (2013.01); *F24F 11/0015* (2013.01); *F24F 2001/0051* (2013.01); *F24F 2003/144* (2013.01); *F24F 2003/1446* (2013.01); *F24F 2011/0002* (2013.01); *F24F 2011/0056* (2013.01); *Y02B 30/746* (2013.01)

(58) Field of Classification Search
CPC ........ F24F 3/14; F24F 3/1405; F24F 11/0008; F24F 13/04; F24F 13/08; F24F 13/10; F24F 13/14; F24F 2001/0051; F24F 2001/0055; F24F 2003/0446; F24F 2011/0002
See application file for complete search history.

(56) References Cited

U.S. PATENT DOCUMENTS

| | | | |
|---|---|---|---|
| 2,102,740 A | * | 12/1937 | Philipp ................. F24F 3/1405 165/121 |
| 2,338,382 A | | 1/1944 | Marlow |
| 2,939,296 A | | 6/1960 | Coblentz |

(Continued)

OTHER PUBLICATIONS

European Search report received in EP 13839800 mailed on May 24, 2016.

(Continued)

*Primary Examiner* — Jonathan Bradford
(74) *Attorney, Agent, or Firm* — Dorsey & Whitney LLP

(57) ABSTRACT

An air conditioning system includes a housing defining a first airflow path therein between an outside air inlet over a cooling coil and an outlet for delivering outside air from the outside air inlet over the coil to the outlet, a second airflow path between a return air inlet over the cooling coil and to the outlet for delivering return air over the cooling coil, and a third airflow path between the return air inlet and the outlet for delivering return air through the housing without passing over the cooling coil. The system includes outside, return, and bypass air dampers that are sequentially moveable between open and closed positions for directing air through or preventing air from entering the first, second, and third airflow paths, respectively. A controller independently controls the opening and closing of each damper in response to data received from the sensor.

20 Claims, 3 Drawing Sheets

(56) References Cited

U.S. PATENT DOCUMENTS

| | | | | |
|---|---|---|---|---|
| 4,210,278 | A | * | 7/1980 | Obler ................. G05D 23/1931 165/229 |
| 4,627,568 | A | | 12/1986 | Lortie et al. |
| 4,630,670 | A | * | 12/1986 | Wellman ............... F24F 3/0442 165/216 |
| 4,730,772 | A | * | 3/1988 | Lortie ...................... F24F 3/14 165/222 |
| 4,841,733 | A | | 6/1989 | Dussault et al. |
| 4,987,952 | A | * | 1/1991 | Beal ..................... F24F 3/1405 165/225 |
| 5,884,492 | A | * | 3/1999 | Zwicky ................ F24F 11/0008 261/129 |
| 6,386,281 | B1 | | 5/2002 | Ganesh et al. |
| 6,427,461 | B1 | | 8/2002 | Whinery et al. |
| 6,508,066 | B1 | | 1/2003 | Mierins et al. |
| 6,792,767 | B1 | * | 9/2004 | Pargeter .................. F24F 3/153 236/44 C |
| 2002/0125333 | A1 | * | 9/2002 | Ganesh ............. G05D 23/1393 236/49.3 |
| 2006/0086112 | A1 | | 4/2006 | Bloemer et al. |
| 2010/0082161 | A1 | * | 4/2010 | Patch ................... F24F 11/0001 700/276 |
| 2011/0264275 | A1 | | 10/2011 | Thomle et al. |
| 2011/0264280 | A1 | | 10/2011 | Grabinger et al. |
| 2012/0160470 | A1 | * | 6/2012 | Misumi ................ B60H 1/3207 165/287 |
| 2012/0253524 | A1 | | 10/2012 | Norrell et al. |
| 2013/0324027 | A1 | | 12/2013 | Davis |

OTHER PUBLICATIONS

Crisner, "Basic Air Balance Procedures Common to All Systems," Airflow Technical Products, Inc., Quality Assured to ISO 9001, available at least as early as Feb. 2, 2017, pp. 1-15.

Lennox, "Smartairflow™ Supply and Ventilation Airflow measurement White Paper," available at least as early as Oct. 30, 2014, pp. 1-16.

International Search Report from International Application No. PCT/CA2013/000065 mailed May 29, 2013.

International Preliminary Report on Patentability from International Application No. PCT/CA2013/000065 mailed Apr. 2, 2015.

* cited by examiner

AIR CONDITIONING SYSTEM FOR DEHUMIDIFYING AND COOLING AIR

TECHNICAL FIELD

This patent application relates to an air conditioning system for dehumidifying and cooling air.

BACKGROUND

Supermarkets have distinguished requirements, and these requirements can only be met by sufficiently controlling space humidity levels. Moisture control is the greatest concern for a supermarket; too much moisture negatively affects the refrigeration system, and too little moisture negatively affects the fresh fruit and vegetables. For this reason, there is a need to target optimum dehumidification for the supermarket without jeopardizing the comfort and efficiency of the store.

U.S. Pat. No. 6,508,066 describes a single coil dual path dehumidification. The system draws in outside air which is circulated along its own path. A cooling coil is disposed in the dedicated outside path. The outside air therefore passes over the cooling coil and is dehumidified prior to being mixed with any other air. The system also draws in return air from the interior of building. The return air is then drawn into the housing where it is mixed with the outside air. Only the outside air passes over the cooling coil. The dehumidified outside air and the cooled return air form a supply air stream that is delivered to the interior of the building.

U.S. Pat. No. 6,792,767 to Pargeter, et al. describes a control system for a heating, ventilation, and air conditioning (HVAC) unit for controlling the humidity and temperature of interior building space at desired levels regardless of the outside temperature and humidity conditions. The control system employs a combination of modulated return air bypass, modulated capacity compressor, and modulating hot gas reheat. Pargeter does not describe a way of independently controlling the airflow across the cooling coil and the airflow bypassing the cooling coil for fine temperature and humidity adjustments.

Accordingly, there is still a need to provide an air conditioning system capable of fine control over humidity and temperature levels, particularly for use in supermarkets having fine humidity and temperature requirements.

SUMMARY

As described herein, the air conditioning system for dehumidifying and cooling air, and circulating said air through an interior space defined by a structure, comprises a housing defining a chamber, a cooling coil which is preferably a single DX cooling coil located in the chamber, a sensor located in said interior space for measuring a humidity, being RH % level or a dew point sensor measuring dew point temperature, in said interior space, an outside air damper, a return air damper, a bypass air damper, and a controller. The housing defines an outside air inlet for receiving outside air into said chamber, a return air inlet for receiving return air from said interior space into said chamber, and an outlet for delivering air from the chamber to said interior space. The housing further defines a first airflow path therein communicating between said outside air inlet over said coil and said outlet for delivering outside air from said outside air inlet over said coil to said interior space, said system further defining a second airflow path between said return air inlet over said coil and to said outlet for delivering return air from said interior space over said coil to said interior space. The housing further defines a third airflow path between said return air inlet and said outlet for delivering return air through said chamber to said interior space without passing over said coil.

The outside air damper is sequentially moveable between an open position directing outside air to flow through said first airflow path and a closed position where the outside air inlet is closed. The return air damper is sequentially moveable between an open position permitting return air to flow through said second airflow path, and a closed position where the return air is prevented from flowing through said second airflow path and over said coil. The bypass air damper is sequentially moveable between a closed position directing return air to flow to said second airflow path, and an open position where the return air flows through both the second and third airflow paths. The controller is configured to independently control the opening and closing of the outside air damper, the return air damper and the bypass air damper through intermediate positions between the open and closed positions in response to data received from the humidity or dew point sensor.

In accordance with another aspect of the present invention, there is provided a method of dehumidifying and cooling air from an interior space defined by a structure with a dual path air conditioning system, the system comprising a housing defining a chamber, a cooling and dehumidifying coil located in the chamber, a humidity or dew point sensor located in said interior space, an outside air damper, a return air damper, a bypass air damper, and a controller. The housing defines an outside air inlet, a return air inlet, and an outlet. The housing further defines a first airflow path therein communicating between said outside air inlet over said coil and said outlet, said system further defining a second airflow path between said return air inlet over said coil and to said outlet. The housing further defines a third airflow path between said return air inlet and said outlet. The outside air damper is sequentially moveable between an open position directing outside air to flow through said first airflow path and a closed position where the outside air inlet is closed. The return air damper is sequentially moveable between an open position permitting return air to flow through said second airflow path, and a closed position where the return air is prevented from flowing through said second airflow path and over said coil. The bypass air damper is sequentially moveable between a closed position directing return air to flow to said second airflow path, and an open position where the return air flows through both the second and third airflow paths. The controller is configured to independently control opening and closing of the outside air damper, the return air damper and the bypass damper through intermediate positions between the open and closed positions, the controller in communication with the sensor. The method comprises the steps of the outside air inlet receiving outside air into said first airflow path, the first airflow path delivering the outside air over said coil to said outlet; the return air inlet receiving return air into said second airflow path, the second airflow path delivering the return air over said coil to said outlet; the return air inlet receiving return air into said third airflow path, the third airflow path delivering the return air through said chamber to said outlet without passing over said coil; the outlet delivering air from the chamber to said interior space; the sensor measuring a humidity level in said interior space and communicating the humidity level or dew point temperature measurement to the controller; and the controller independently controlling the opening and closing of the outside air damper, the return air damper, and the bypass air damper through intermediate positions between open and closed positions in response to the humidity level measurement.

BRIEF DESCRIPTION OF THE DRAWINGS

The aforementioned features will now be described, by way of example, with reference to the accompanying drawings, in which.

DETAILED DESCRIPTION

Figure 1:
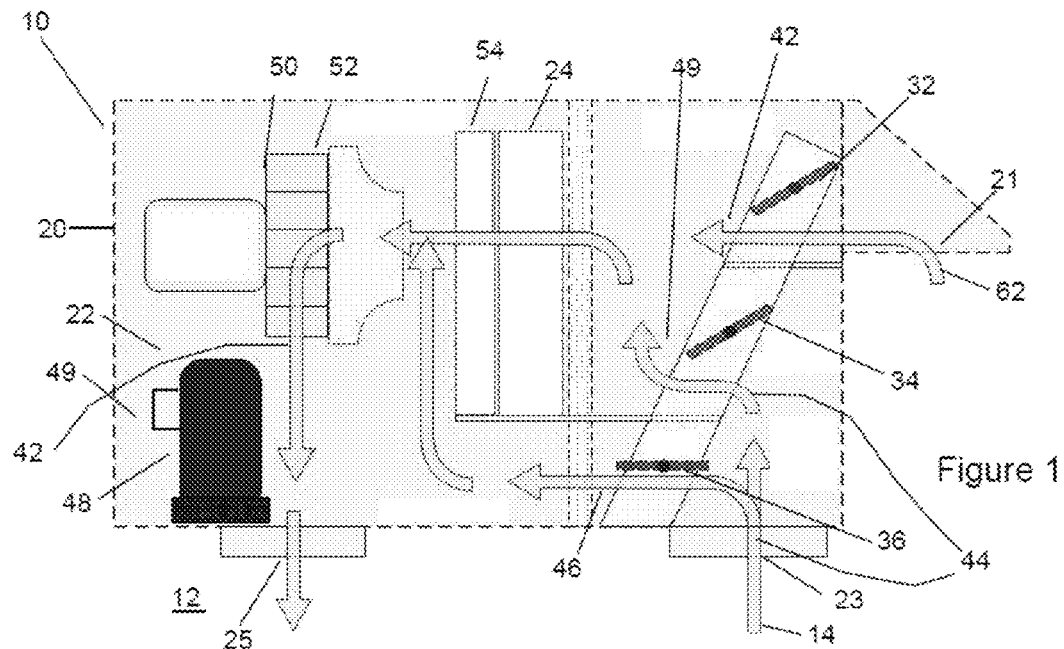
FIG. 1 is a top plan system view of the air conditioning system configured to operate in a dual path mode.
Figure 2:
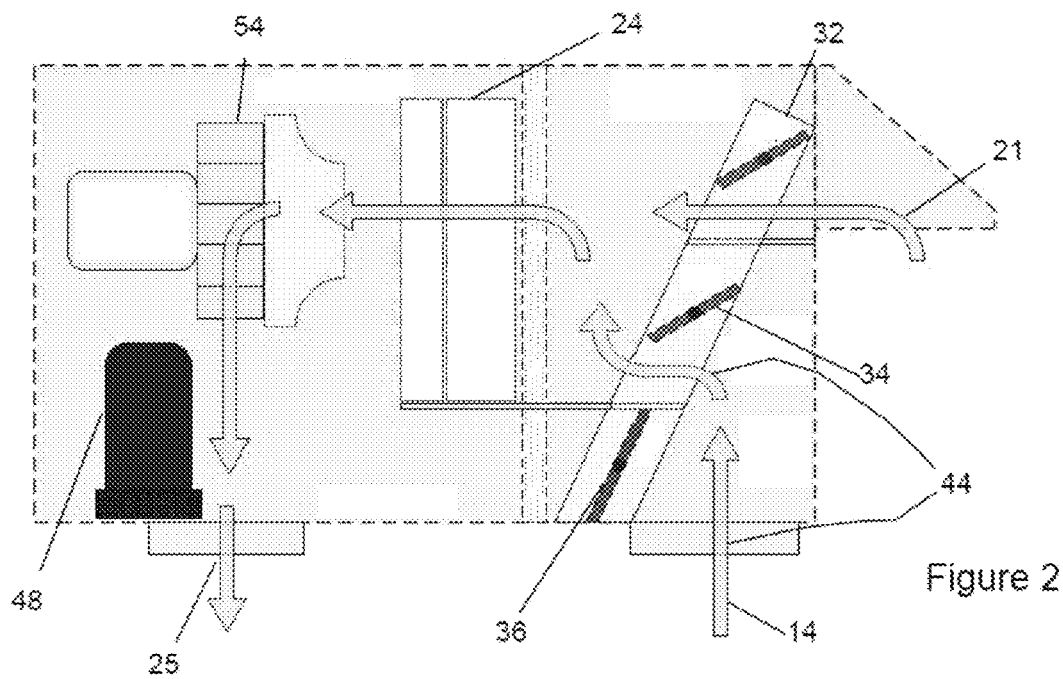
FIG. 2 is a top plan system view of the air conditioning system configured to operate in a single path mode.
Figure 3:
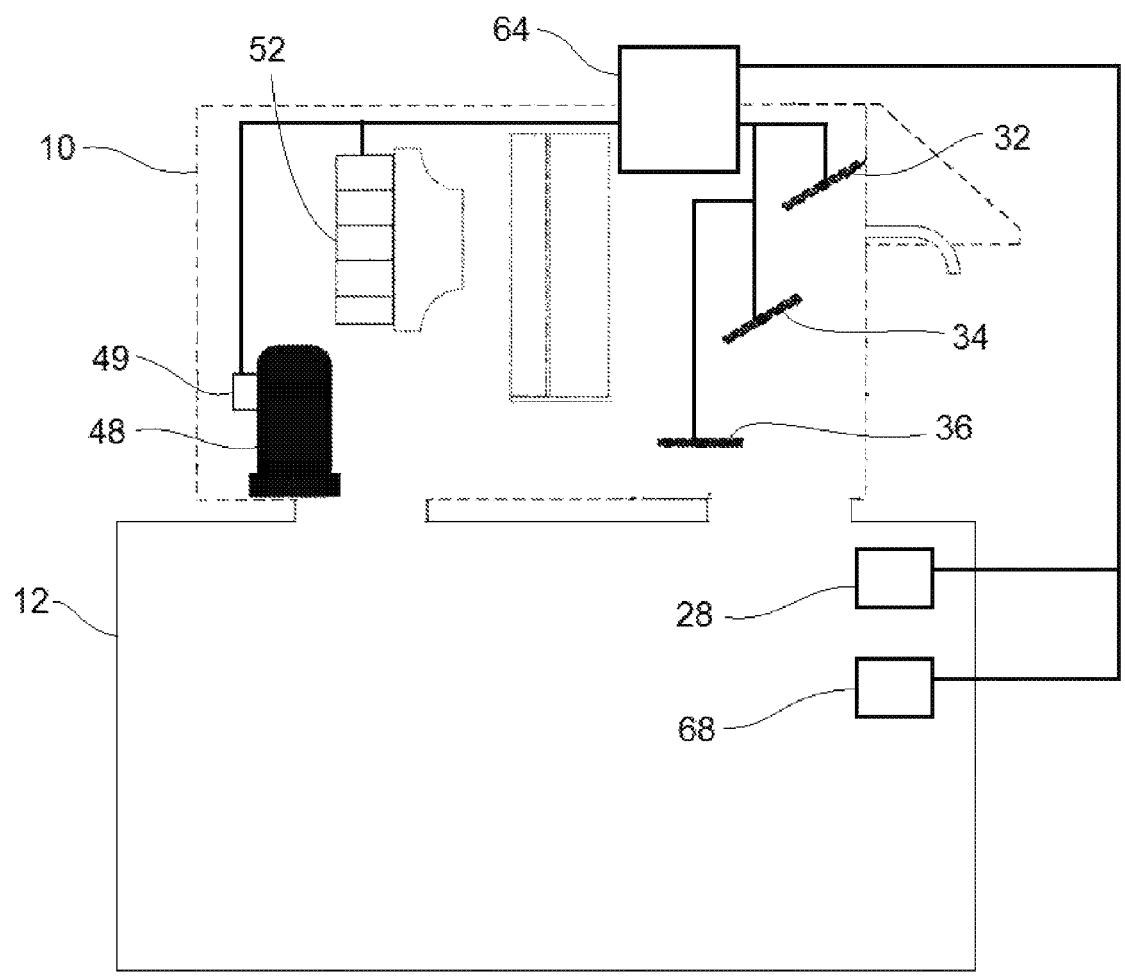
FIG. 3 is a top plan system view of the air conditioning system of FIG. 1 having a controller.

FIG. 1 depicts an air conditioning system, denoted generally as 10. When deployed in or near an interior space 12 of a structure, the system 10 may dehumidify, cool, and circulate air through the interior space 12. The system 10 comprises a housing 20 defining a chamber 22, a cooling and dehumidifying coil 24 located in the chamber 22, a humidity or dew point sensor located in the interior space 12 for measuring a humidity level or dew point temperature in the interior space 12, an outside air damper 32, a return air damper 34, a bypass air damper 36, and a controller 64 (FIG. 3). The housing defines an outside air inlet 21 for receiving outside air 62 into the chamber 22, a return air inlet 23 for receiving return air from the interior space into the chamber 22, and an outlet 25 for delivering air from the chamber 22 to said interior space 12. The housing 20 further defines a first airflow path 42 therein communicating between the outside air inlet 21 over the coil 24 and to the outlet 25 for delivering outside air from the outside air inlet 21 over the coil 24 an through the outlet to the interior space 12. The system 10 further defines a second airflow path 44 between the return air inlet 23 over the coil 24 and to the outlet 25 for delivering return air from the interior space 12 over the coil 24 to the interior space 12. The housing 20 further defines a third airflow path 46 between said return air inlet 23 and the outlet 25 for delivering return air through the chamber 22 to the interior space 12 without passing over the coil 24. The outside air damper 32 is sequentially moveable between an open position permitting outside air to flow through said first airflow path 42 and a closed position where the outside air damper 32 is closed. The return air damper 34 is sequentially moveable between an open position permitting return air to flow through said second airflow path 44, and a closed position where the return air is prevented from flowing through said second airflow path 44 and over said coil 24. The bypass air damper 36 is sequentially moveable between a closed position permitting return air to flow to the second airflow path 44 while preventing return air from flowing into the third airflow path 46, and an open position where the return air flows through both the second 44 and third 46 airflow paths. FIG. 1 shows the bypass air damper 36 in the open position while FIG. 2 shows the bypass air damper 36 in the closed position. A controller 64 (FIG. 3) is configured to independently control the opening and closing of the outside air damper 32, the return air damper 34 and the bypass air damper 36 through intermediate positions between the open and closed positions in response to data received from a sensor preferably located in the interior of the space. By independently controlling the dampers 32, 34, and 36, respectively, the controller 64 may finely control the amount of outside air and return air routed across or bypassing the coil 24 without ever jeopardizing the building pressurization. The unit 10 can control the amount of air across the cooling coil 24 or bypassing the cooling coil without ever slowing down a fan 52.

The fan 52 circulates air through the first 42, second 44, and third 46 airflow paths. Other means for circulating air as known to a person skilled in the art may be used. The fan 52 may be a rotational fan located preferably within the housing 20 or chamber 22 downstream of the cooling coil 24. The fan 52 may be connected to the controller 64 as shown in FIG. 3. The controller 64 may be further configured to control rotation of the fan 52 to suck outside air through the first airflow path 42, return air through the second airflow path 44, and return air through the third airflow path 46. The system 10 may also comprise additional fans (not shown) each disposed in one of the airflow paths 42, 44, and 46, each additional fan also connected to the controller 64 such that the controller 64 may more finely control the volume of return air and outside air traveling through each of the airflow paths 42, 44, and 46.

As shown in FIG. 3, the system 10 may further include a temperature sensor 28 located in said interior space 12 in addition to a relative humidity level humidity or dew point sensor 68, and connected to the controller 64. The controller 64 always requires a temperature sensor 28. The sensors may be included with a controller exterior of the housing but the necessary measurements are relayed to controller 64. The temperature sensor 28 may measure temperature level of air in the interior space and transmit the temperature measurement to the controller 64. The controller 64 may be configured to use the measurement of temperature sensor along with the relative humidity level sensor to internally calculate a dew point temperature of said interior space 12. The controller 64 may be further configured to independently control the opening and closing of the outside air damper 32, the return air damper 34 and the bypass damper 36 through intermediate positions between the open and closed positions in response to the temperature or dew point measurement received from the temperature sensor 28, humidity or dew point sensor 68, or the combination of both transmitted measurements to controller 64 used to calculate dew point. When controller 64 does not demand dehumidification, as the interior space is within the control limits, but the temperature sensor relates a high space temperature to controller 64, the interior space temperature relayed to controller 64 will provide independent control of the opening and closing positioning of the return air damper 34 and bypass air damper 36. The system may further include a cooling compressor 48 in fluid connection with the cooling coil 24. The cooling compressor 48 may be configured to supply a flow of coolant through the cooling coil 24 at a coolant suction pressure determined by the compressor-capacity output. Capacity output refers to the output percentage demanded by controller 64 to compressor 48 to maintain the desired suction pressure set point of the cooling coil 24. The capacity output varies by an analog signal by the controller 64 to the compressor module controller. The compressor 48 may be connected to the controller 64 as shown in FIG. 3 to transmit compressor 48 data to the controller 64, the compressor 48 data including a measurement of compressor capacity output and a measure of coolant suction pressure. The controller 64 may be configured to independently control the compressor capacity output in response to data received from said relative humidity or dew point sensor thereby varying the coolant suction pressure and the temperature of the cooling coil 24. The controller 64 sends an analog signal to the compressor module that states the amount of capacity required based upon measurement of the suction pressure. The suction pressure set point is established by the dew point temperature, which is either read from a sensor or calculated in the controller 64 by use of temperature and humidity. It is the dew point temperature that also controls the return air and bypass air dampers along with the suction pressure. As the dew point temperature increases, the cooling coil temperature gets colder, so the suction pressure set point is lowered. These results in the return air damper closing more and the bypass air damper opening more. The temperature sensor 28, humidity sensor 68, and dew point measurements may be relayed through an analog output if controller 64 does not have the temperature and relative humidity sensors directly connected to it. It is always the dew point temperature, whether it be directly read from a relative humidity or dew point sensor 68 or calculated in the controller 64 via temperature and humidity that is the priority measurement for suction pressure set point and damper modulation. Damper modulation will alter based upon suction pressure at a certain state, but the dew point temperature will be the primary beginning point of where the damper position should be. As the suction pressure floats, the dampers will modulate to maintain suction pressure at certain states.

In one implementation, where the dew point measurement—being either read directly from the dew point sensor or calculated by use of the temperature sensor and humidity sensor—is greater than a predetermined dew point temperature threshold, the controller 64 may be configured to reposition the bypass air damper 36 towards the open position to increase the amount of return air traveling through the third airflow path 46 bypassing the cooling coil 24. In this way, the coolant suction pressure may be reduced as less air is traveling across the coil 24. This reduces the air velocity across the cooling coil. Typically, fresh outside air entering the interior space 12 through the outside air inlet 21 has a higher humidity measurement, or amount of moisture, than the return air. In another implementation, where the dew point measurement measures greater than a predetermined dew point threshold, the controller 64 may be configured to reposition the return air damper 34 towards the closed position to decrease the amount of return air traveling through the second airflow path across the cooling coil. The return air damper can fully close to allow 100% isolation of the outside air. As the interior dew point temperature rises, this is the measured or calculated dew point temperature that represents the interior temperature at which the water vapor changes phase to a liquid, it is primarily due to the outside air. By isolating the outside air via opening the bypass damper to a greater position and closing the return air damper to a smaller position, the outside air can be fully dehumidified. This results in a larger amount of the return air being bypassed, which is advantageous. When the outside air is isolated and more interior space air is being bypassed, the cooling coil temperature easily drops. The cooling coil SHR, being the sensible heat ratio of the coil, drops quite low and more of the cooling coil is dedicated to removing latent energy. A byproduct of this process is sensible cooling, and a cold and dry off-coil air condition will not only reduce the interior dew point temperature, but it will also cause the interior temperature to fall. Off-coil refers to the air leaving the cooling coil. The greater quantity of interior space bypass air that has not been treated mixes with the cold and dry off-coil air and this helps with increasing the final air temperature that is delivered to the interior space. The modulation of the dampers aids in this process called "overcooling of the airstream." As the dampers modulate, a certain quantity of interior space bypassed air is always mixing with the cold and dry off-coil air. This greatly aids in decreasing the "overcooling" effect of the dehumidification process. By both opening the bypass air damper 36 and closing the return air damper 34 simultaneously, even greater dehumidification of the outside air may be achieved than simply modulating one of the dampers 36 and 34. Maximum dehumidification may be achieved by system 10 where the controller 64 fully opens the bypass air damper 36 and fully closes the return air damper 34. In this configuration, the cooling compressor 48 may be operating at maximum capacity output in order to extract moisture from the outside air traveling across the coil 24. Preferably, the dew point may be controlled by the controller 64 continuously making small adjustments to the bypass 36 and return air dampers 38 in order to maintain a relatively constant space air 14. This air represents the space dew point temperature. The dew point returning to the housing via the return air path is not necessarily identical to the space dew point temperature. The air relates to the actual interior space condition, being temperature and dew point, which is relayed to controller 64.

In one implementation, where the dew point measurement from the relative humidity sensor 68, or the calculated dew point from controller 64, measures less than a predetermined humidity threshold programmed into the controller 64, the controller 64 may be configured to reposition the bypass air damper 36 towards the closed position to decrease the amount of return air traveling through the third airflow path 46 bypassing the cooling coil 24. The controller 64 may also be configured to reposition the bypass air damper 36 toward the closed position and open the return air damper 34 to a greater position throughout maximum peak dehumidification when the suction pressure begins to fall below its acceptable lowest threshold. The maximum peak dehumidification performance is achieved when the return air damper is fully closed and the bypass air damper is fully open. This allows the outside air to be fully isolated and the coil SHR (sensible heat ratio) to be at its lowest position, as when controller 64 measures a dew point temperature at the peak threshold. The digital compressor has a greater operating efficiency when the capacity output is above 51%. The operating envelope of the compressor has a greater capacity output when compared to its motor kW input is more favorable when the compressor capacity is above 51%. The compressor motor kW is not linear to its capacity output. Lower capacity output of the compressor will have an overall lower energy efficiency ratio, being EER which is a ratio of the compressor capacity output to the motor input watts. The controller 64 takes this into consideration, as it attempts to keep the compressor output capacity at a higher energy efficiency ratio. This is achieved by modulating the dampers. This strategy takes place only when the unit is in full dehumidification and the suction pressure set point is at its lowest limit. If the suction pressure set point is at its lowest limit, the space dew point is at its highest measurement or it surpasses the highest measurement. If the digital scroll begins to modulate at this point, it indicates that the load is reducing as it requires less capacity to maintain the desired suction pressure set point. If the digital scroll begins to modulate at this point, the bypass air damper will close slightly and the return air damper will open slightly. This allows a greater amount of air to pass over the cooling coil, which increases the quantity of air and air velocity across the cooling coil. The final effect is a greater load for the cooling coil. Consequently, this increases the heat load absorbed by the refrigerant (coolant)—the latent heat of vaporization. Since a greater amount of store air is now passing over the cooling coil, the damper positions and dew point temperature set point are reset. As the space dew point drops, the dampers continue to change and the suction pressure set point continues to rise. The suction pressure set point rises as a higher coil SHR is required; therefore, the overall compressor capacity of the unit required to maintain the desired suction pressure set point is less. This is continually repeated until the dew point temperature reaches its lowest limit (threshold) and the unit compressors shutdown. Similarly, in one implementation, where the humidity or dew point measurement from the humidity or dew point sensor or calculated measurement from controller 64 measures less than a predetermined humidity threshold programmed into the controller 64, the controller 64 may be configured to reposition the return air damper 34 towards the open position to increase the amount of return air traveling through the second airflow path 44 across the cooling coil 24. By closing the bypass air damper 36 and opening the return air damper 34, more return air will be traveling through second airflow path 44 across the cooling coil 24, meaning that more return air will be cooled by the cooling coil 24. Where the bypass air damper 36 is fully closed and the return air damper 34 is fully open, maximum cooling efficiency of the system 10 will be achieved.

The controller 64 may be further configured to independently reposition the bypass air damper 36, the return air damper 34, and the outdoor air damper 32 in order to maintain the dew point measurement within a predetermined dew point range prior to repositioning the bypass air damper 36, the return air damper 34, and the outdoor air damper 32 in order to maintain the temperature measurement within a predetermined temperature range. Refrigerated display cases are effective dehumidifiers, and the desired dew point limits can be designed around the refrigerated display cases. Since the cases are designed for a maximum dew point temperature of 58° F., a maximum limit of 50° F. guarantees a lesser load on the refrigeration system. A typical "ramp-up" of the compressors to begin the dehumidification sequence takes place when the interior space is at a dew point temperature of 47.8° F. This guarantees a pre-emptive start prior to reaching the maximum limit. It is at this point that the cooling coil SHR is at its highest, the suction pressure set point is at its highest, and the return air is at its beginning opening position, which is its largest opening position, and the bypass is at its beginning opening position, which is its smallest opening position. When the interior space dew point temperature is furthest from the desired maximum dew point set point, the maximum amount of allowable air to pass the cooling coil throughout the dehumidification strategy is at this beginning point. Accordingly, where there are competing predetermined settings for both space dew point and temperature programmed into the controller 64, the controller 64 may be programmed to modulate the dampers 32, 34, and 36 to match the measured dew point with the desired dew point in advance of attempting to match the desired temperature. In this implementation, only when moisture in the air has reached an acceptable level will the controller 64 attempt to change the air temperature by modulating the dampers 32, 34, and 36.

Any air that is routed across the coil 24 in the first 42 or second 44 airflow paths may be cooled a greater amount than air bypassing the coil 24 in the third airflow path 46. It will be cooled to a greater amount as it passes through the cooling coil when the cooling coil is active. Where the controller 64 receives a measurement from the temperature sensor 28 that is a greater value than programmed into the controller (in other words, the space air temperature is higher than desired), the controller 64 may independently control the dampers 32, 34, and 36 to route more return air across the coil 24. Where the controller 64 is programmed so that dew point has a higher priority than temperature but temperature sensor 28 measurement exceeds the programmed threshold (when the interior space dew point temperature is greater than the set point but a high space temperature exists), and the controller 64 determines that the temperature measurement from temperature sensor is within a predetermined temperature range, then the controller 64 may control the dampers 32, 34, and 36 to route less return air across the coil 24, if needed to greater reduce the moisture content of the outside air traveling through the first airflow path 42. This is completely proportional to the interior space dew point. As the interior space dew point rises, the suction pressure set point continues to drop. This decreases the cooling coil SHR. Space dew point temperature typically rises due to the fresh air. The fresh air load for a typical supermarket is the largest load source; therefore, the interior space moisture content rises due to the fresh air. The controller 64 catches this rise in dew point temperature and executes the detailed strategy of floating the suction pressure and modulating the dampers.

When there exists only a temperature demand, or "cool" "demand," and the interior space dew points satisfied, the cooling coil temperature required is not as aggressive as dehumidification. The suction pressure set point is elevated; consequently, the DX cooling coil SHR is more elevated. This allows a greater percentage of the coil to be dedicated to sensible cooling (temperature). The suction pressure continues to float based upon the high space temperature. As the space temperature rises, the suction pressure drops; however, it will never drop to a condition identical to dehumidification requirement. The compressor capacity output in this scenario is much less than that of the dehumidification sequence.

The digital scroll compressor is the mechanical pump that controls the mass flow rate of the refrigerant, or coolant as it has been described. The control of the mass flow rate is what controls the overall refrigeration effect, and this is controlled by the desired suction pressure set point. The unit can include multiple compressors. There can be multiple combinations of compressors that are broken into individual suction groups. This allows them to control differently based upon the described space conditions. Multiple combinations of compressor groups, or known as suction groups, make it possible to have independent suction set points. A suction set point is the desired control saturation temperature of the refrigeration (coolant). This is the temperature of when the liquid refrigerant changes phase from a liquid to a vapor, which is entitled the latent heat of vaporization. The lower the set point will accommodate a lower (colder) refrigerant (coolant) saturation temperature. This will cause a lower (colder) cooling coil temperature, which is a lower cooling coil SHR. Maximum dehumidification strategy will have the bypass air damper fully opened, the return air damper fully closed, and the suction set point at its lowest point, which is typically 33° F. Maximum dehumidification strategy occurs when the interior space dew point is at its highest allowable limit, which is typically 50.2° F. Therefore, the suction pressure set point is at its lowest possible temperature set point when the interior space dew point is at its highest allowable limit. When multiple combinations of compressor grouping are used, a variation in suction pressure set point for the dedicated compressor group is utilized. For example, four compressors have two independent suction grouping. Each group is independent of the other, such that four compressors would have two independent suction groups. Each group would thus have two compressors, and each compressor "grouping" would have its own dedicated suction pressure set point. This set point floats based upon the interior space dew point (dehumidification) and temperature (cooling), such as previously defined.

In another implementation, the system 10 may further comprise a suction pressure sensor 49 located in fluid connection with the cooling coil 24 and the cooling compressor 48. The sensor 49 may make a measurement of suction pressure in the coolant fluid traveling between the cooling compressor 48 to the coil 24. The sensor 49 may be connected to the controller 64 (Fig. 3) and communicate the suction pressure measurement to the controller 64. The controller 64 may be further configured to independently control the opening and closing of the outside air damper, the return air damper and the bypass damper through intermediate positions between the open and closed positions in response to data received from said suction pressure sensor. As explained previously, in order to operate system 10 efficiently, it may be preferable to maintain a constant load across the cooling coil 24 such that the compressor 48 power and coolant suction pressure may remain constant. Once desired dew point or temperature levels have been achieved in the interior space air, the controller 64 may be configured to modulate dampers 32, 34, and 36 to route as much return air and outside air as possible across the cooling coil 24 in order to maintain constant compressor power 48 and coolant suction pressure. In other words, the controller 64 may be further configured to reposition the bypass air damper 36 towards the closed position in response to the temperature measurement measuring within a predetermined temperature range and the dew point measurement measuring within a predetermined dew point range. However, if the desired temperature could not be achieved by modulating the dampers 32, 34, and 36 to maximum positions, the controller 64 may control the compressor 48 to independently increase coolant suction pressure in response to the temperature measurement measuring less than a predetermined temperature threshold. Similarly, where the temperature measurement measures greater than a predetermined temperature threshold, the controller 64 may control the cooling compressor 48 to decrease the coolant suction pressure below a predetermined coolant suction pressure threshold. The controller 64 may control the cooling compressor 48 in this way in response to the temperature measurement of the temperature sensor 28 measuring within a predetermined temperature range and the dew point measurement of the sensor 26 measuring within a predetermined dew point range.

By the controller 64 being capable of making adjustments to each of the dampers 32, 34, and 36 in order to finely control the dew point and temperature of the space air 14, the system 10 does not require use of a hot gas reheating coil 54. However, in one implementation, as optionally shown in FIGS. 1 and 2, a hot gas reheat coil 54 may be optionally disposed in the chamber 22 downstream of the cooling coil 21 in the first airflow path 42. The reheat coil is capable of increasing the temperature of cooling coil off-coil air by passing across the reheating coil 54 in the first 42 and second 44 airflow paths, respectively. The reheat coil can be connected to the controller 64, so the controller 64 determines when the enabling of the reheat coil is required based upon the interior space temperature.

The controller 64 may be further configured to independently reposition each of the return air damper and the bypass air damper prior to controlling the cooling compressor 48 coolant suction pressure or compressor capacity output in order to maintain the dew point or temperature of the space air within predetermined dew point and temperature ranges, respectively.

In addition to controlling dew point and temperature, the controller 64 may also control the dampers 32, 34, and 36 in order to maintain the total amount of air in the chamber 22 between predetermined minimum and maximum air volumes. In particular, the controller 64 may be further configured to reposition the outdoor air damper 32 towards the open position to increase the amount of outside air traveling through the first airflow path 42 in response to the bypass air damper 36 and return air damper 34 being opened to a predetermined position thereby maintaining a total volume of air traveling through the first airflow path 42 and the second airflow path 44 above a predetermined minimum system air flow volume. The outdoor air damper 32 may be positioned at various intermediate positions between open and closed, or the controller 64 may be configured to position the outside air damper 32 at only particular predetermined positions in order to more easily predict the effects of modulating the return 34 and bypass 36 air dampers on the system 10. As a certain quantity of outside air is always required throughout the occupancy of the building to maintain a desired positive pressurization, there may be a predetermined minimum or maximum open or closed position of the outside air damper 32 programmed into the controller 64. In order to maintain a minimum amount of air flow through the first 42 and second 44 airflow paths, there may be a predetermined maximum amount of air programmed into controller 64 that may be bypassed around the coil 24. In one implementation, the maximum amount of air that may be bypassed may be approximately 9000 cubic feet per minute (CFM) in a larger system 10 designed for a larger interior space 12, or approximately 4000 CFM in a smaller system 10 designed for a smaller interior space 12. In one implementation, the maximum amount of air that may be bypassed may be equivalent to half of the total air travelling through the system 10. For example, where a maximum amount of return air that may be bypassed is approximately 4000 CFM, and 4000 CFM of return air is being bypassed, then 4000 CFM of outside air would also be traveling through the system 10.

Figure 4:
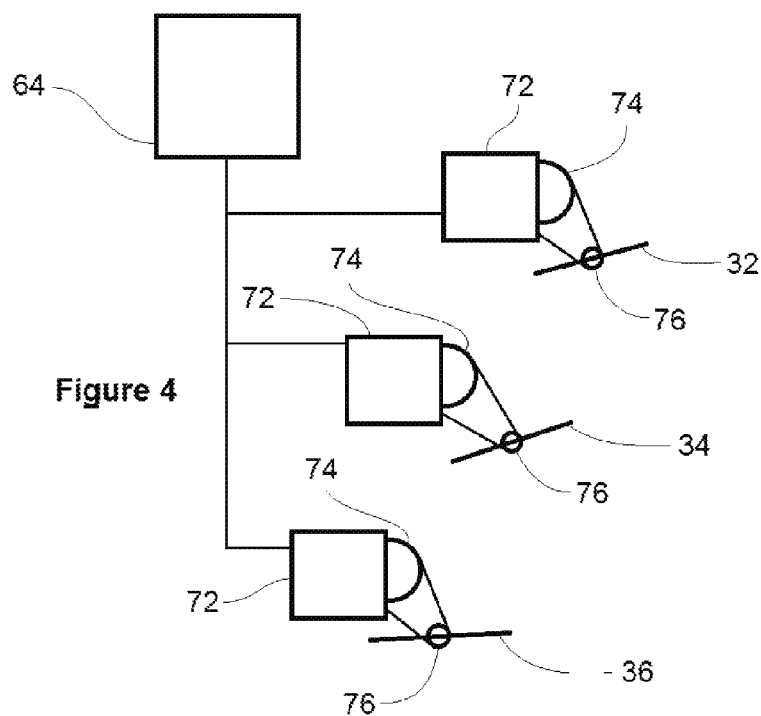
FIG. 4 is a top plan system view of the air conditioning system of FIG. 1 having damper gears.

In an implementation shown in FIG. 4, each of the bypass air damper 36, return air damper 34, and outdoor air damper 32 may be mounted to the housing 20 through a respective damper gear 76, each damper gear 76 being mechanically linked to a respective independent control gear 74, the controller 64 being further configured to independently control the opening and closing of the outside air damper 32, the return air damper 34 and the bypass damper 36 through intermediate positions between the open and closed positions by actuating the respective independent control gear 74 in response to data received from said sensors 26 and 28, or the controller 64 calculated dew point temperature. In the preferred embodiment of the present invention, the dampers move in response to an actuator 72 which is a motor driven mechanism. The actuator is attached to a linked gear assembly, and they turn in response to the actuator positioning. As a person skilled in the art will appreciate, there are different ways to move the dampers, but all are driven by the use of a motor driven actuator.

The controller 64 (FIG. 3) may be a computing device configured to perform the controlling functionality described herein. In this implementation, the controller may include a data processor and an input/output subsystem. The data processor controls the overall operation of the controller, and may comprise a microprocessor in communication with non-volatile memory and volatile memory (random access memory, or RAM). Either the non-volatile memory or RAM may include computer processing instructions, which when executed by the microprocessor, implement an operating system, and computer programs. Alternately, the computer processing instructions may be copied from the non-volatile memory to the RAM upon reset or power-up of the controller, or at any other time when the controller is powered on, and executed by the microprocessor out of the RAM. Preferably, once the system 10 is installed, the controller is powered on and remains on. The non-volatile memory may comprise flash memory, read-only memory, one or more magnetic hard drives or other magnetic or optical media. The input/output subsystem is in communication with the data processor. The input/output subsystem may comprise input ports for connecting communication cables between the controller and each of the dampers 32, 34, and 36, and between the controller and each of the dew point and temperature sensors. Alternatively, the dampers 32, 34, and 36 may communicate wirelessly with the controller through a wireless communications interface supported by the input/output subsystem. The operating system of the data processor allows the controller to operate the input/output subsystem in that data received from each sensor by the input/output subsystem is communicated by the input/output subsystem to the data processor. The data processor may compare the received sensor data to predetermined temperature and humidity thresholds stored in either the non-volatile memory or RAM, and send control signals through the input/output subsystem to at least one of the dampers 32, 34, and 36 in accordance with predetermined damper profiles to change either the temperature or humidity levels of air in the space 12 entering the system 10. The controller could also be on a network.

In another implementation, the controller 64 may be a microcontroller including a processor core, memory, and input/output subsystem connected to each element being controlled. Microcontroller memory is preferably non-volatile memory, and may include flash memory and read-only memory containing operation instructions that when executed by the processor core cause the controller to perform as described herein.

Figure 5:
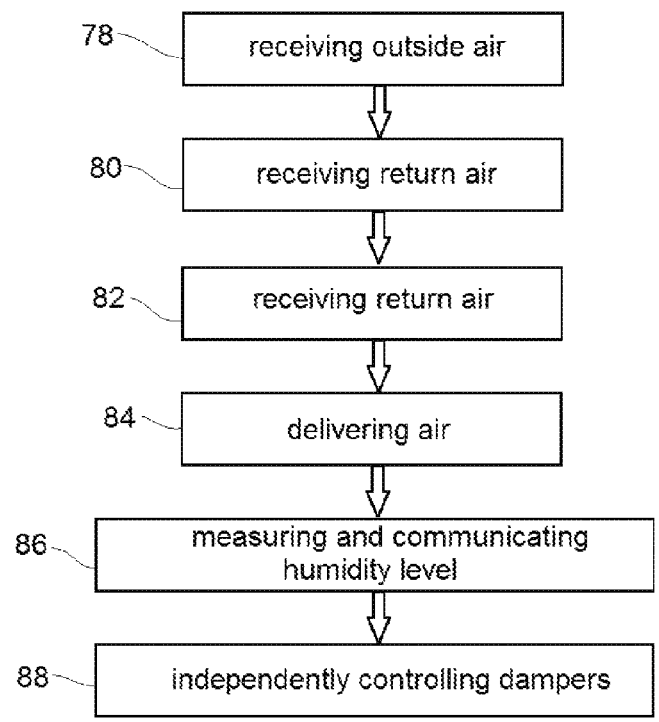
FIG. 5 is a flow chart showing a method of dehumidifying and cooling air in an interior space.

FIG. 5 shows a method of dehumidifying and cooling air from an interior space defined by a structure with the dual path air conditioning system described herein. At 78, the outside air inlet 21 receives outside air into the first airflow path 42, the first airflow path 42 delivering the outside air over the coil 24 to the outlet 25. At 80, the return air inlet 23 receives return air into the second airflow path 44, the second airflow path 44 delivers the return air over the coil 24 to the outlet 25. At 82, the return air inlet 23 receives return air into the third airflow path 46, the third airflow path 46 delivering the return air through said chamber 22 to the outlet 25 without passing over the coil 24. At 84, the outlet 25 delivers air from the chamber 22 to the interior space 12. At 86, the sensor 68 measures a humidity level in the interior space 12 and communicates the humidity level measurement to the controller 64 wherein humidity level is used in conjunction with the temperature measurement to calculate dew point. At 88, the controller 64 independently controls the opening and closing of the outside air damper 32, the return air damper 34, and the bypass air damper 36 through intermediate positions between open and closed positions in response to the calculated dew point.

Although the invention is described in terms of particular implementations, it is to be understood that the invention is not limited in its application to the details of construction and to the arrangements of the components set forth in the description or illustrated in the drawings. The invention is capable of other embodiments and of being practiced and carried out in various ways without departing from the scope of the invention. Accordingly, the scope of the claims should not be limited to the preferred embodiments set forth in the examples, but should be given the broadest interpretation consistent with the description as a whole.

The invention claimed is:

1. An air conditioning system for dehumidifying and cooling air, and circulating said air through an interior space defined by a structure, the system comprising:
   a housing defining a chamber, the housing further defining an outside air inlet for receiving outside air into said chamber, a return air inlet for receiving return air from said interior space into said chamber, and an outlet for delivering air from the chamber to said interior space;
   a cooling and dehumidifying coil located in the chamber;
   said housing defining a first airflow path therein communicating between said outside air inlet over said coil and to said outlet for delivering outside air from said outside air inlet over said coil to said interior space, said system further defining a second airflow path between said return air inlet over said coil and to said outlet for delivering return air from said interior space over said coil to said interior space;
   said housing further defining a third airflow path between said return air inlet and said outlet for delivering return air through said chamber to said interior space without passing over said coil;
   a sensor located in said interior space for measuring a humidity level in said interior space;
   an outside air damper sequentially moveable between an open position permitting outside air to flow through said first airflow path and a closed position where the outside air inlet is closed;
   a return air damper sequentially moveable between an open position permitting return air to flow through said second airflow path, and a closed position where the return air is prevented from flowing through said second airflow path and over said coil;
   a bypass air damper sequentially moveable between a closed position permitting return air to flow to said second airflow path, and an open position where the return air flows through the third airflow path and toward said return air damper; and
   a controller configured to:
      independently control the opening and closing of the outside air damper, the return air damper and the bypass air damper through intermediate positions between the open and closed positions in response to data received from said sensor;
      reposition the bypass air damper into an intermediate position closer to the open position in response to a dew s point measurement measuring greater than a predetermined dew point range to increase the amount of return air traveling through the third airflow path bypassing the cooling coil, and
      reposition the return air damper into an intermediate position closer to the closed position in response to a dew point measurement measuring greater than a predetermined dew point range to decrease the amount of return air traveling through the second airflow path across the cooling coil.

2. The air conditioning system of claim 1, further comprising a fan for circulating air through said first, second, and third airflow paths.

3. The air conditioning system of claim 1, wherein the sensor further comprises a dew point temperature sensor located in said interior space for measuring a dew point temperature level in said interior space, and wherein the controller is further configured to independently control the opening and closing of the outside air damper, the return air damper and the bypass damper through intermediate positions between the open and closed positions in response to data received from said dew point temperature sensor.

4. The air conditioning system of claim 3, further comprising a cooling compressor in fluid connection with the cooling coil, the cooling compressor configured to supply a flow of coolant through the cooling coil, the cooling compressor being at a coolant suction pressure determined by the compressor capacity output, wherein the controller is further configured to independently control the compressor capacity output in response to data received from said sensor.

5. The air conditioning system of claim 1 wherein the controller is further configured to reposition the bypass air damper towards the closed position to decrease the amount of return air traveling through the third airflow path bypassing the cooling coil, the bypass air damper being repositioned in response to a dew point measurement measuring less than a predetermined dew point range or a temperature measurement measuring greater than a predetermined temperature range.

6. The air conditioning system of claim 1 wherein the controller is further configured to reposition the return air damper towards the open position to increase the amount of return air traveling through the second airflow path across the cooling coil, the return air damper being repositioned in response to a dew point measurement measuring less than a predetermined dew point range or a temperature measurement measuring greater than a predetermined temperature range.

7. The air conditioning system of claim 4, further comprising a suction pressure sensor located in fluid connection with the cooling coil and the cooling compressor for measuring the coolant suction pressure, wherein the controller is further configured to independently control the opening and closing of the outside air damper, the return air damper and the bypass damper through intermediate positions between the open and closed positions in response to data received from said suction pressure sensor.

8. The air conditioning system of claim 7 wherein the controller is further configured to independently control the cooling compressor to increase the coolant suction pressure in response to the dew point or temperature measurement measuring less than a predetermined dew point or temperature range.

9. The air conditioning system of claim 7 wherein the controller is further configured to independently control the cooling compressor to decrease the coolant suction pressure in response to a dew point or temperature measurement measuring greater than a predetermined dew point or temperature range.

10. The air conditioning system of claim 7 wherein the controller is further configured to independently reposition the bypass air damper prior to controlling the cooling compressor coolant suction pressure in order to maintain the dew point measurement within a predetermined dew point range.

11. The air conditioning system of claim 7 wherein the controller is further configured to independently reposition the return air damper prior to controlling the cooling compressor coolant suction pressure in order to maintain the dew point measurement within a predetermined dew point range.

12. The air conditioning system of claim 3 wherein the controller is further configured to independently reposition the bypass air damper, the return air damper, and the outdoor air damper in order to maintain the dew point measurement within a predetermined dew point range prior to repositioning the bypass air damper, the return air damper, and the outdoor air damper in order to maintain a temperature measurement within a predetermined temperature range.

13. The air conditioning system of claim 7 wherein the controller is further configured to reposition the bypass air damper towards the closed position in response to a temperature measurement measuring within a predetermined temperature range and the dew point measurement measuring within a predetermined dew point range.

14. The air conditioning system of claim 13 wherein the controller is further configured to reduce the coolant suction pressure below a predetermined coolant suction pressure threshold in response to the temperature measurement measuring within a predetermined temperature range and the dew point measurement measuring within a predetermined dew point range.

15. The air conditioning system of claim 4 wherein the controller is further configured to reposition the outdoor air damper towards the open position to increase the amount of outdoor air traveling through the first airflow path in response to the return air damper being opened to a predetermined position thereby maintaining a total volume of air traveling through the first airflow path and the second airflow path above a predetermined minimum system air flow volume.

16. The air conditioning system of claim 15 wherein as the return air damper closes, the velocity of the air entering the housing via the outdoor air damper increases, as the return air damper closes and the bypass air damper opens, the velocity of the air passing through a bypass area increases, and when the return air damper closes, the outdoor air damper closes from 3- 6%.

17. The air conditioning system of claim 1 wherein each of the bypass air damper, return air damper, and outdoor air damper is mounted to the housing through a respective damper gear, each damper gear being mechanically linked to a respective independent control gear, the controller being further configured to independently control the opening and closing of the outside air damper, the return air damper and the bypass damper through intermediate positions between the open and closed positions by positioning a motor driven actuator that is connected to-a respective independent gear assembly in response to data received from said sensor.

18. The air conditioning system of claim 1, further comprising a fan assembly comprising a rotational fan located within said housing downstream of said cooling coil, the fan assembly connected to the controller, wherein the controller is further configured to control rotation of the rotational fan to suck outside air through the first airflow path, return air through the second airflow path, and return air through the third airflow path.

19. A method of dehumidifying and cooling air from an interior space defined by a structure with a dual path air conditioning system, the system comprising:

a housing defining a chamber, the housing further defining an outside air inlet, a return air inlet, and an outlet;

a cooling coil located in the chamber;

said housing defining a first airflow path therein communicating between said outside air inlet over said coil and said outlet, said system further defining a second airflow path between said return air inlet over said coil and to said outlet;

said housing further defining a third airflow path between said return air inlet and said outlet;

a sensor located in said interior space;

an outside air damper sequentially moveable between an open position directing outside air to flow through said first airflow path and a closed position where the outside air inlet is closed;

a return air damper sequentially moveable between an open position permitting return air to flow through said second airflow path, and a closed position where the return air is prevented from flowing through said second airflow path and over said coil;

a bypass air damper sequentially moveable between a closed position directing return air to flow to said second airflow path, and an open position where the return air flows through both the second and third airflow paths; and a controller configured to independently control opening and closing of the outside air damper, the return air damper and the bypass damper through intermediate positions between the open and closed positions, the controller in communication with the sensor;

the method comprising:

the outside air inlet receiving outside air into said first airflow path, the first airflow path delivering the outside air over said coil to said outlet;

the return air inlet receiving return air into said second airflow path, the second airflow path delivering the return air over said coil to said outlet;

the return air inlet receiving return air into said third airflow path, the third airflow path delivering the return air through said chamber to said outlet without passing over said coil;

the outlet delivering air from the chamber to said interior space;

the sensor measuring a humidity level in said interior space and communicating the humidity level measurement to the controller wherein humidity level is used in conjunction with a temperature measurement to calculate dew point;

the controller independently controlling the opening and closing of the outside air damper, the return air damper, and the bypass air damper through intermediate positions between open and closed positions in response to the calculated dew point;

the controller repositioning the bypass air damper into an intermediate position closer to the open position in response to a dew point measurement measuring greater than a predetermined dew point range to increase the amount of return air traveling through the third airflow path bypassing the cooling coil; and the controller repositioning the return air damper into an intermediate position closer to the closed position in response to a dew point measurement measuring greater than a predetermined dew point range to decrease the amount of return air traveling through the second airflow path across the cooling coil.

20. The method of claim 19 wherein the dual path air conditioning system further comprises:

a temperature sensor located in said interior space, the temperature sensor in communication with the controller; and a cooling compressor in fluid connection with the cooling coil;

the method further comprising the steps of:

the temperature sensor measuring a temperature level in said interior space and communicating the temperature level measurement to the controller, the temperature level being at least one of a dry bulb temperature or a dew point temperature;

the cooling compressor supplying a flow of coolant through the cooling coil, the cooling compressor being at a coolant suction pressure determined by the compressor capacity output;

the controller independently controlling the compressor capacity output in response to the calculated dew point; and the controller independently controlling the opening and closing of the outside air damper, the return air damper and the bypass damper through intermediate positions between the open and closed positions further in response to the temperature level measurement.

* * * * *